July 3, 1951
T. SHEDLOVSKY
2,559,571
THERMOCOUPLE THERMOMETER
Filed Jan. 2, 1946
2 Sheets-Sheet 1
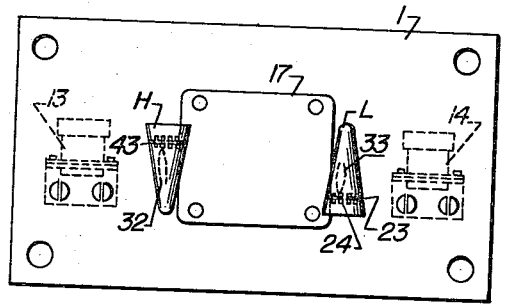
Fig. 4
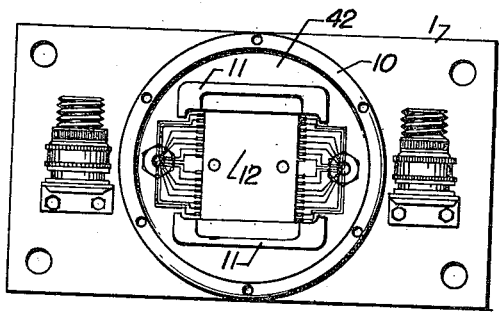
Fig. 3
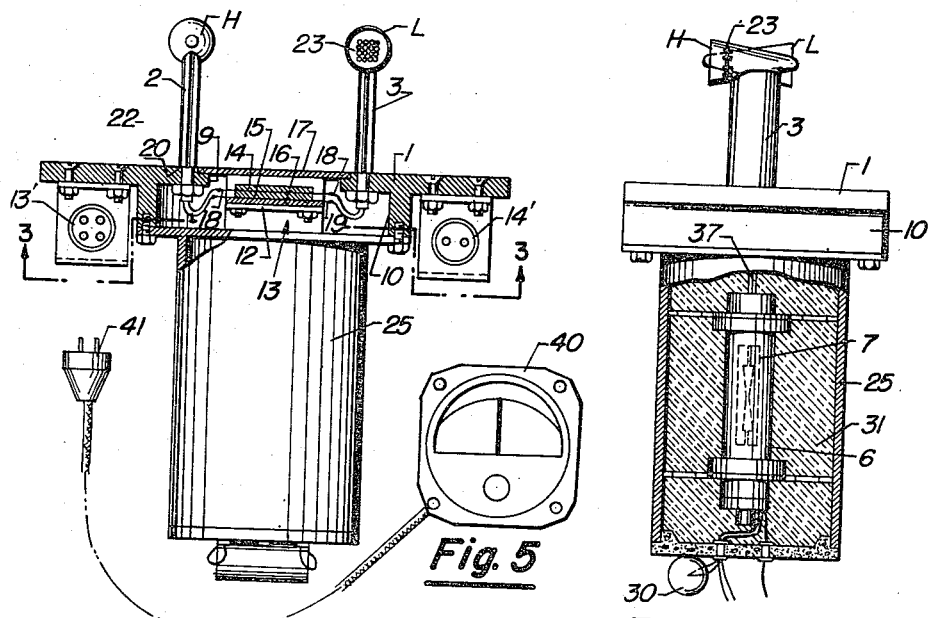
Fig. 1
Fig. 5
Fig. 2
Inventor
Theodore Shedlovsky
By M. C. Hayes
Attorney

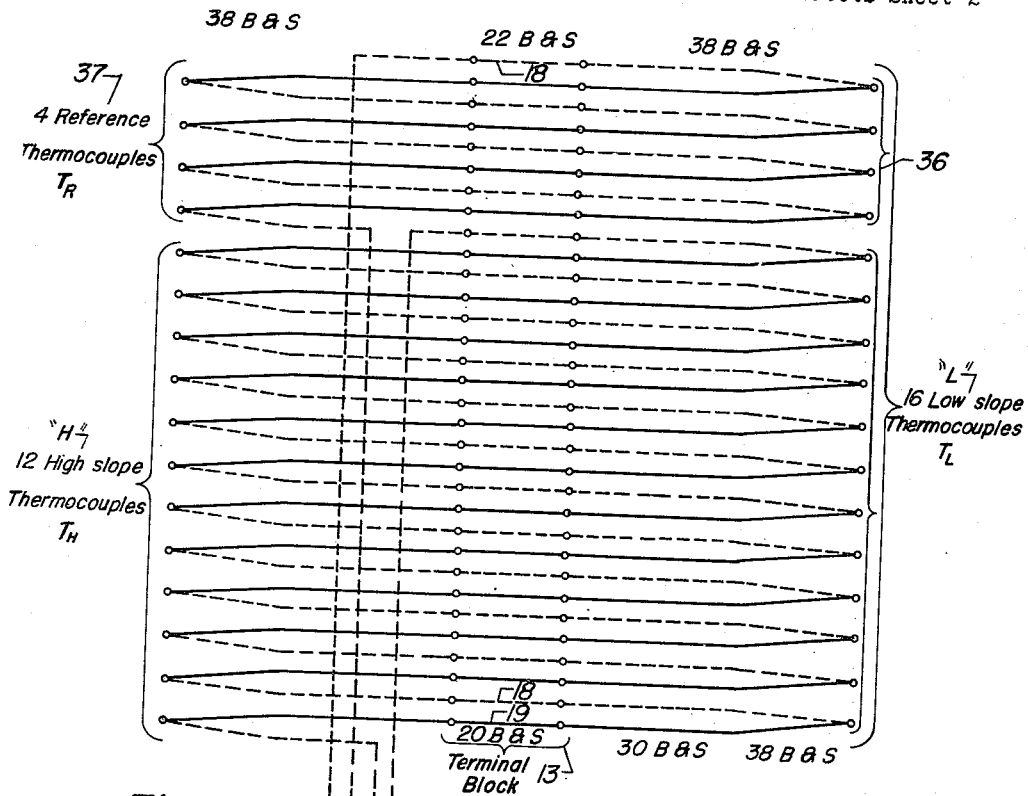
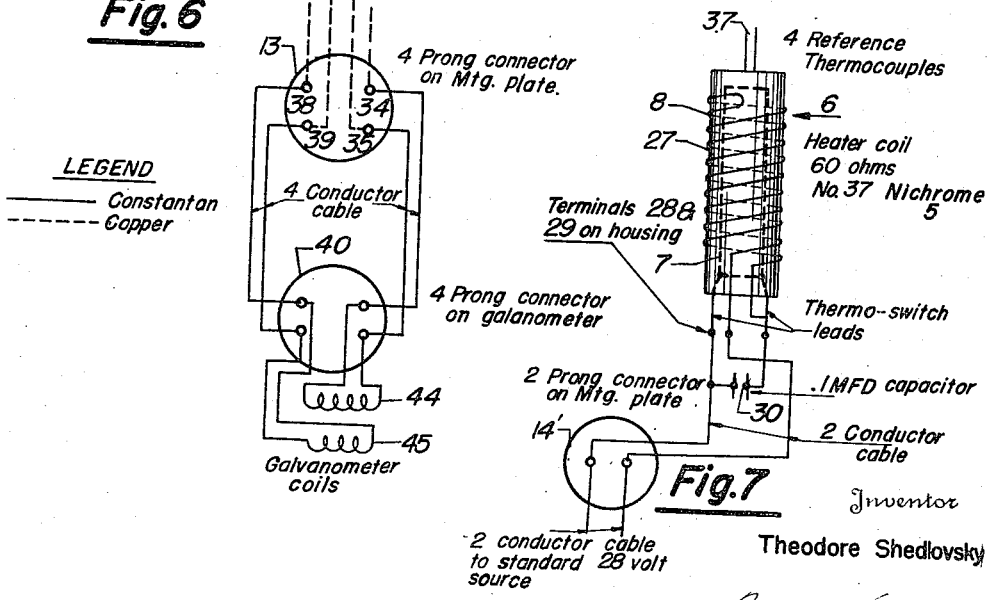

Patented July 3, 1951

2,559,571

UNITED STATES PATENT OFFICE 2,559,571

THERMOCOUPLE THERMOMETER

Theodore Shedlovsky, New York, N. Y., assignor to the United States of America as represented by the Secretary of the Navy Application January 2, 1946, Serial No. 638,693

16 Claims. (Cl. 73—359)

This invention relates to an improvement in thermometers, particularly to a thermometer for determining more accurately, in an airplane while in flight, the temperature of the free air surrounding the airplane.

A thermometer placed in a rapid air stream does not indicate the free air temperature, but a higher one, due largely to the compression of the gas (air) as it is brought to rest in its impingement with the sensitive element and friction of air moving past the side of the element. The compression is essentially adiabatic. For accurate determination of free air temperature, it is therefore necessary that a compensating correction be applied. This invention is designed to provide accurate continuous pointer indications requiring no corrections for airspeed. Errors due to compression and friction, which, in the usual type of aircraft temperature-indicating instruments result in values which are too high, are automatically eliminated in this invention. Two thermocouple elements, oppositely oriented, are used differentially to correct automatically for temperature effects due to air velocity.

Errors due to radiation tend to be minimized in this instrument by providing a partial shield in the integral design of the temperature-sensitive elements, the exteriors of which present highly polished and reflecting chromium surfaces, and by recommending that these elements be mounted on the under side of an airplane wing surface.

For velocities below sound velocity, shock waves do not enter into consideration, and in the absence of serious vortex effects, Bernoulli's theorem is valid. Using this theorem and the ideal gas equation of state, there is obtained the following equation for the difference between the stagnation temperature, which contains the adiabatic compression error, and the free air temperature:

$$T - T_0 = \frac{\gamma - 1}{\gamma} \cdot \frac{MV^2}{2R} \quad (1)$$

in which $T$ is the stagnation temperature, $T_0$ the free air temperature, $M$ the average molecular weight of air (29.0), $R$ the gas constant ($8.31 \times 10^7$), $\gamma$ the ratio of the specifice heat at constant pressure to the specific heat at constant volume (1.40), and $V$ is the velocity. If the temperatures are expressed in centigrade degrees and the velocity in miles per hour, Equation 1 reduces to $$T - T_0 = 10^{-4} V^2 \quad (1')$$

The effect of frictional heat developed in the boundary layer surrounding a thermometer in a rapid gas stream has been estimated in special simple cases. But owing to the fact that the distribution of velocity in the layer is not uniform, since it is not entirely laminar, but partly turbulent, no exact computation of the quantitative effect of friction on the indicated temperature has been possible. However, it may be predicted that the effect is also linear with the square of the velocity, independent of density of air, and with a coefficient of the same order of magnitude as for the adiabatic compression effect.

Results obtained on thermometric probes mounted in the wide part of a conical element, oriented with the axis parallel to the air stream, confirms the linear dependence on the square of the velocity up to speeds of about 500 miles per hour; but it is believed that no difficulties should be encountered at higher velocities as long as they are below values at which shock waves can be expected. When air is directed against the base of the conical elements, the slope, $K_H$, of the plots $T - T_0$ vs. $V^2$ is reproducible, lying between 0.9 and $1.0 \times 10^{-4}$ for different elements. Also, shifts of angle within 15° between the conical axis and the direction of the air stream does not alter the results with properly designed elements.

If the position of the cone is completely reversed in the air stream so that it impinges on the nose of the cone instead of on the base, similar linear plots of $T - T_0$ vs. $V^2$ are obtained; but in this case the slope, $K_L$, although equally reproducible and relatively unaffected by small changes in angle, is considerably lower, namely, $0.6-0.7 \times 10^{-4}$. In this case, vortex regions exist, which probably accounts for the fact that $K_L$ is smaller than $K_H$, since a vortex retains kinetic energy which in the former case appeared as heat. The difference between the values of $K_H$ and $K_L$ provides the theoretical basis for the free air temperature instrument.

The basis for the design of this instrument thus rests on the use of two conical thermometer elements oppositely oriented. If we designate by H the thermal element exhibiting the higher slope and by L the one exhibiting the lower slope in the $T$ vs. $V^2$ plots, the following equations are found to hold for these two elements:

$$T_H - T_0 = K_H V^2 \quad (2)$$

$$T_L - T_0 = K_L V^2 \quad (3)$$

Eliminating $V^2$ from (2) and (3) we obtain $$T_0 = T_L - \left(\frac{K_L}{K_H - K_L}\right)(T_H - T_L) \quad (4)$$

This is our basic equation for the instrument. The first term, $T_L$, is given by a thermocouple in the L element whose reference junction is maintained at some constant temperature. The factor $T_H - T_L$ in the other term is given by differential thermocouples between elements H and L. The values of the slopes $K_H$ and $K_L$ for the two respective elements, H and L, are determined by laboratory calibration and the coefficient $$\frac{K_L}{K_H - K_L}$$

in Equation 4 is thus accurately determined. With the conical elements I have used, the numerical value of this coefficient lies somewhere between 2 and 3.

A suitable indicating instrument for $T_0$, based on Equation 4 is provided by a sufficiently sensitive galvanometer containing two independent coil windings on the same frame and capable of accommodating two corresponding independent circuits. One of these circuits measures $T_L$ while the other simultaneously measures $$\left(\frac{K_L}{K_H - K_L}\right)(T_H - T_L)$$

so that the net rotation of the coil frame of the galvanometer is proportional to the difference between these two terms which is $T_0$, the free air temperature, which is thus corrected automatically for the air velocity effects. In order to realize this practically, if the tendency of the galvanometer to deflect in one direction, corresponding to $T_L$ is a certain amount per degree of $T_L$, the tendency for deflection in the opposite direction, corresponding to $$\frac{K_L}{K_H - K_L}(T_H - T_L)$$

should be accurately $$\frac{K_L}{K_H - K_L}$$

times as much per degree of $(T_H - T_L)$. The two opposite deflection tendencies depend on the ampere turns in the two independent coil windings, and as I have already stated, the value of $$\frac{K_L}{K_H - K_L}$$

is less than 3. It is therefore possible to make proper adjustment for the required ampere turns ratio by using three times as many thermocouples in series for measuring the second term on the right hand side of Equation 4 as for measuring the first and then finally make suitable adjustment of the electrical resistance in the two circuits.

Owing to the fortunate fact that the ratio of the specific heats at constant pressure to constant volume, $\gamma$, is essentially constant for air over a wide range of pressure and temperature, Equation 4 can be expected to be valid under aeronautical conditions. In fact, tests which have been carried out in a high speed wind tunnel in which wide variations in temperature and density were achieved in effect, yielded results in close agreement with those obtained under laboratory conditions.

It is important to note that in order to serve satisfactorily as a method for indicating free air temperature, the time lag of response of the H and L elements must be small differentially since, if this were not so, Equation 4 would no longer hold. In other words, the elimination of $V^2$ from Equations 2 and 3 which led to Equation 4 presupposes that the time required for the establishment of new steady states is similar in the two cases. The use of quickly responding thermocouples makes it possible to meet this condition satisfactorily.

The principal object of my invention is to provide differential thermometer means for automatically correcting the temperature effects due to air velocity.

Other objects and advantages of the invention will be apparent during the course of the following description.

In the accompanying drawings, forming a part of this specification, and in which like numerals are employed to designate like parts throughout the same, Fig. 1 is a front elevational view partly in section;

Fig. 2 is a side elevational view partly in section;

Fig. 3 is a cross-sectional view along line 3—3 of Fig. 1;

Fig. 4 is a top view of Fig. 1;

Fig. 5 is a differential galvanometer for indicating the output of my device;

Fig. 6 is a wiring diagram of the thermocouple circuits connected to the differential galvanometer; and Fig. 7 is a wiring diagram of the heater and thermostat.

The assembled instrument consists generally of a mounting plate 1, two struts 2 and 3 secured perpendicularly to said plate, two conically housed thermal elements H and L oppositely oriented and secured to the extremities of said struts, and at hermostat assembly 6 consisting of a thermoswitch 7 and an electrical heater unit 8 properly housed and secured to the opposite side of said mounting plate.

The rectangular mounting plate 1, centrally and squarely apertured 9, is provided with an open ended cylindrical member 10 integrally cast on one side of said plate and circumscribing said aperture with ample clearance, and forming chamber 42. Along two opposite edges of the squared aperture 9, within said chamber 42, are provided elongated abutments 11 cast integrally with the mounting plate 1. Said abutments are spanned by a plate element 12 cast integrally with said abutments. A four-prong connector 13' and a two-prong connector 14' are mounted on said mounting plate on opposite sides of said cylindrical member 10. The two-prong connector carries power to an electric heater, circuit and the four-prong connector forms a connection from thermocouple circuits, basic to my invention, to a type No. 3500 Greibach galvanometer, all hereinafter described.

To the underside of the spanning plate 12 is secured at hermocouple terminal block 13 which serves to facilitate assembling. It consists of a layer of sixteen parallel copper wires B and S gage 22, reference numeral 18, and another layer of sixteen constantan wires B and S gage 20, reference numeral 19, all insulated and held firmly between three aluminum plates 14, 15, 16 which are all secured to spanning plate 12. The terminal block 13 serves two important functions: it tends to reduce appreciably the electrical resistance of the circuit, and also to dissipate conducted heat from a heater coil hereinafter described. A removable cover plate 17 is provided for the squared aperture 9 to seal the chamber and provide access to the terminal block when necessary.

The two streamlined struts 2 and 3 are rigidly and perpendicularly secured to the underside of the mounting plate, on opposite sides of the squared aperture 9, through means of strut-receiving apertures in said mounting plate which communicate with the chamber 42. The securing end of the strut is provided with a reduced cross-sectional portion forming a shoulder 20 which abuts against the underside 22 of the mounting plate, and is securely held thereto by means of a nut 21 which threadedly engages the securing end of the strut and the topside of the mounting plate. The struts 2 and 3 are hollow for the reception of thermocouple wires to be strung therethrough.

Two conical housings H and L (approximately 1.6 inches long, and 0.76 inch base diameter) oppositely oriented are silver-soldered to the extremities of their respective streamlined struts 2 and 3, with the long axis of a cone at right angles to the longitudinal axis of the strut and coaxial with the chord axis of said streamlined strut. The chord is the straight line connecting the leading and trailing edge of a streamlined strut. A circular Bakelite plate is secured into the hollow cones several millimeters back from the edge of the base, forming a recessed base. The length of cone extending beyond the Bakelite tends to provide a limited degree of shielding from radiation, but any undue extension of this length results in undesirable effects. One of said Bakelite plates 23 is provided with 16 holes arranged in checkerboard fashion into which are press-fit small silver rivets 24 which are exposed to the air externally of said conical housing L and which also communicate with the interior of said housing. The other of said Bakelite plates 43 in the other conical housing H is similarly constructed, but only with 12 silver rivets.

Over the cylindrical chamber is mounted a flanged thermostat housing 25 within which is secured a thermostat assembly 6. The assembly 6 contains a Fenwal No. A7000 thermoswitch 7 for the reception of four series-connected reference thermojunctions, and an electrical heater unit 8 surrounding said switch. The thermoswitch is surrounded by a close fitting, but not tight, aluminum cylinder 27 around which the electrical heater wire 8 is wound. The heater coil is connected to housing terminals 28 and 29, through the thermoswitch 7, secured in the top of the thermostat housing. A capacitor 30 is connected across the terminals of the thermoswitch. The two-prong connector 14' is electrically connected across the heater input terminals 28 and 29. The electrical power required for operating the electrical heater in the thermostat is about ten watts supplied from the 24–28 volt source usually available in Navy aircraft. No special voltage regulating is required. The thermostat assembly 6 is mounted firmly within the thermostat housing, and packed with De-volatilized-Santocel 31. This material serves as a good heat insulator, so that a ten-watt heater is adequate for maintaining the reference temperature within the thermoswitch at a temperature of 65.4° C., or another temperature near this value for an outside the airplane temperature as low as −75° C. The electrical heater 8 consists of about 22 inches of No. 37 Nichrome V wire (33 ohms per foot).

Requirements of ruggedness in the indicating galvanometer are such as to limit seriously the sensitivity of this part of the equipment. For this reason it is necessary to increase the thermoelectric power supplied by the thermocouples for a given increment of temperature. This is accomplished by using four thermocouples in series for measuring $T_L$, and twelve in series for measuring $(T_H - T_L)$ in Equation 4.

The thermocouples are of copper-constantan metals. The constantan strands have a mid-section consisting of the 20 B and S gage wires mounted in the terminal block, the ends consist of 38 B and S gage wire, and the intervening sections consist of 30 B and S gage wire. The copper strands have a mid-section consisting of the 22 B and S gage wires mounted in the terminal block, and the remainder consisting of 38 B and S wire gage. To minimize heat conduction errors in the junctions, due to heat flow between them and the thermocouple wire strands, very fine wires are used for the first inch of length leading into the conical housings. The use of very fine wires over longer distances would result in loss of sensitivity because of the electrical resistance which would thus be materially increased. The remainder of the constantan circuit path is carried by heavier wire so as to reduce electrical resistance. In the case of the copper circuit path, however, its low resistance does not warrant the use of heavier wire strands. But all the wires in the terminal block are relatively heavy to facilitate the dissipation of heat at this point, since the reference junctions are at 65.4° C.

The two similar conical thermocouple pick-ups, high slope H and low slope L, oppositely oriented, are embodied in an electrical circuit as follows: The former contains twelve silver rivets 24 and the latter, sixteen. Twelve series pairs of (differential) thermojunctions connect an equal number of silver rivets of said H and L pick-ups, such as thermojunctions 32 and 33. Each of the thermojunctions is soldered to respective silver rivets. The thermocouple strands are conducted through the hollow struts to the terminal block 13. The output wires of said circuit group of thermocouples are connected to two prongs 34 and 35 of the four-prong connector 13' through a hole provided therefore in the cylindrical chamber wall.

Four series pairs of reference thermojunctions of another circuit group of thermocouples connect the remaining four silver rivets on element L and the temperature reference zone (65.4° C.) in the thermoswitch 7. Each of the four thermojunctions 36 in the L element is soldered to one of the remaining four silver rivets. The four cooperating thermojunctions 37 in the thermoswitch are insulated from each other, bunched together and secured therein at a depth of about three-fourths inch. The thermocouple strands leading from the L element to the thermoswitch 7 reference zone (65.4° C.) are conducted through the hollow strut 3. The output of said circuit group of thermocouples is connected to the remaining two prongs 38 and 39 of the four-prong connector 13' through a hole provided therefor in the cylindrical chamber wall 10.

Said two related thermocouple circuits are basic to my invention.

A galvanometer indicator 40 of special design is used, containing two independent coil windings and capable of accommodating two correspondingly independent electric circuits. One of the galvanometer coils is connected in series with the differential thermojunction circuit. This circuit also contains a series resistor, not shown in Fig. 6, which can be adjusted. The other galvanometer coil is connected in series with the reference thermojunction circuit. Such a galvanometer is the Type No. 3500 Greibach galvanometer. This meter, properly calibrated and plugged by means of plug 41 into connector 13', serves as the indicator of my free air temperature measuring equipment. The adjustable series resistor (not shown in Fig. 6) is set at a value which corresponds accurately to the proper value of $$\frac{K_L}{K_H - K_L}$$

(Equation 4) which had been previously determined by calibration of the H and L elements.

Operation

My device can be installed on an airplane, or mounted in any rapidly moving air stream, so that the bottom surface of the mounting plate is flush with the underside of a wing. The thermostat housing 25 extends within the wing space. The axes of the thermocouple pick-ups are oriented parallel with the air stream, the H pick-up squarely facing the air stream, and the L pick-up oppositely oriented to said H pick-up.

A thermometer placed in a rapid air stream does not indicate the free air temperature, but a higher one, due largely to the compression of the gas as it is brought to rest in its impingement. This compression is essentially adiabatic.

Accordingly, when the plane is in flight, an air stream is directed against the silver rivets in the H pick-up element resulting in their acquiring a temperature somewhat higher than the free air temperature. The increment of temperature higher than the free air temperature is due to adiabatic compression of the air against said silver rivets, and is a function of speed. Since the thermojunctions are soldered to the rivets, they acquire the equivalent temperature of the rivets.

The L pick-up element is completely reversed in the air stream so that the air impinges on the apex of the L element instead of on the base as was the case with the H element. Under these conditions the silver rivets in the L element likewise acquire a temperature somewhat higher than the free air temperature. However, the increment of temperature higher than the free air temperature in this L element is somewhat lower than the corresponding increment of temperature in the H element. This difference of temperature provides the theoretical basis for the automatic airspeed correction of my free air temperature instrument. As a result of the temperature differences of the thermojunction, the L element is considered the "cold" junction, and the H element is considered the "hot" junction. Under this temperature differential condition, current will flow in the twelve series thermocouples' circuit, its associated galvanometer coil 44 will be energized, and the galvanometer movement influenced thereby in a manner which measures the term $$\left(\frac{K_L}{K_H - K_L}\right)(T_H - T_L)$$

of Equation 4.

Since the four series thermocouples circuit junctions 36, are at the temperature $T_L$, and the cooperating four junctions 37 are at the reference temperature point, $T_R = 65.4°$ in the thermoswitch assembly, there likewise exists a temperature differential, the former being the "cold" junction and the latter being the "hot" junction. Under this temperaure differential condition in the reference thermojunction circuit, current will flow therein, its associated galvanometer coil 45 will be energized, and the galvanometer movement will be correspondingly influenced in a manner which measures the term $T_L$ of Equation 4.

The net result of the two coil fields 44 and 45 will actuate the galvanometer movement and its pointer to a true free air temperature indication to be read on the calibrated instrument scale.

In conclusion, it is to be understood that while the embodiment of the invention which has been described is to be preferred, changes may be made in the construction and arrangement of parts without departing from the spirit and scope of the appended claims.

What is claimed is:

1. In a thermometer for measuring the temperature of a rapidly flowing fluid medium, in combination: a mounting plate; a pair of projecting struts mounted on the same side of said plate; first and second substantially conical housings, oppositely oriented, secured to the ends of said struts, the axes of said conical housings being substantially normal to the axes of the struts and parallel to the path of flow, and each of said housings having an inset base with a plurality of heat conducting rivets therethrough; constant temperature means mounted on the side of said plate opposite from the side on which said struts are mounted; a plurality of series-connected thermocouples having their hot junctions individually connected to the inner ends of a corresponding number of rivets in the base of said first housing and having their cold junctions individually connected to the inner ends of a corresponding number of rivets in the base of said second housing for generating a first thermocouple voltage, the rivets in said first and second housings being maintained at different first and second temperatures respectively in accordance with the degrees of compression of the fluid thereon; a second plurality of series-connected thermocouples having their cold junctions individually connected to the inner ends of a corresponding number of remaining rivets in the base of said first housing for generating a second thermocouple voltage, and having their hot junctions associated with said constant temperature means; and a differential galvanometer responsive to said first and second thermocouple voltages.

2. In a thermometer for measuring the temperature of a rapidly flowing fluid medium in combination: supporting means; constant temperature means carried by said supporting means; first and second plate members adapted to make contact with said fluid, each having heat conducting inserts therethrough and having a housing on one side thereof, mounted oppositely oriented on said supporting means, both said plate members being substantially perpendicular to the path of flow, said first and second plate members being subjected to different degrees of compression of said fluid; a first thermocouple having its hot junction means connected to the inserts in said first plate member and having its cold junction means connected to the inserts in said second plate member for generating a first thermocouple voltage; a second thermocouple having its cold junction means connected to the inserts in said first plate member and having its hot junction means associated with said constant temperature means for generating a second thermocouple voltage; and differential indicating means responsive to said first and second thermocouple voltages.

3. In a thermometer for measuring the temperature of a rapidly flowing fluid medium, in combination: constant temperature means; first and second substantially flat heat conducting elements adapted to make contact with said fluid, having a closure on one side thereof, disposed oppositely oriented in said fluid substantially perpendicular to the path of flow, said first and second elements being subjected to different degrees of compression of said fluid; a first thermocouple having its hot junction means connected to said first element and having its cold junction means connected to said second element for generating a first thermocouple voltage; a second thermocouple having its cold junction means connected to said first element and having its hot junction means associated with said constant temperature means for generating a second thermocouple voltage; and differential indicating means responsive to said first and second thermocouple voltages.

4. In a thermometer for measuring the temperature of a rapidly flowing fluid medium, in combination: constant temperature means; first and second shield members substantially oppositely oriented in said fluid in a line substantially parallel to the path of flow and subjected to different degrees of compression of said fluid respectively; a first thermocouple having its hot and cold junction means on opposite sides of said first and second shield members respectively for generating a first thermocouple voltage; a second thermocouple having its cold junction means disposed similarly as the hot junction means of said first thermocouple and having its hot junction means associated with said constant temperature means for generating a second thermocouple voltage; and differential indicating means responsive to said first and second thermocouple voltages.

5. In a thermometer for measuring the temperature of a rapidly flowing fluid medium, in combination, a first plurality of thermocouple elements, first conical housing means mounting said first plurality of thermocouple elements within said medium in a manner whereby said elements are maintained at a higher temperature than the true temperature of the fluid as a result of compression of the fluid and in an amount proportional to the speed of flow of the fluid, a second plurality of thermocouple elements, means for maintaining said second plurality of thermocouple elements at a substantially constant temperature, a third plurality of thermocouple elements, second conical housing means disposed in a different direction from said first conical housing means for mounting said third plurality of thermocouple elements within said fluid medium in a manner whereby said third plurality of thermocouple elements are maintained by compression of the medium at a temperature above the true temperature of the medium by an amount proportional to the speed of flow of the medium but less than the temperature of said first plurality of thermocouple elements, a galvanometer having first and second deflection coils, first circuit means of predetermined resistance connecting said first plurality of thermocouple elements and some of said third plurality of thermocouple elements in series to said first deflection coil for energizing the coil, and second circuit means of predetermined resistance connecting said second plurality of thermocouple elements and the remainder of said third plurality of thermocouple elements in series to said second deflection coil for energizing said second coil.

6. In a thermometer for measuring the temperature of a rapidly flowing fluid medium, in combination, a first plurality of thermocouple elements, first conical housing means mounting said first plurality of thermocouple elements in said fluid medium in a manner whereby said elements are maintained at a higher temperature than the true temperature of the fluid as a result of compression of the fluid and in an amount proportional to the speed of flow of the medium, a second plurality of thermocouple elements, second conical housing means disposed in a different direction from said first conical housing means for mounting said second plurality of thermocouple elements in said fluid medium in a manner whereby said second plurality of thermocouple elements are maintained by compression of the fluid at a temperature above the true temperature of the medium by an amount proportional to the speed of movement of the medium but less than the temperature of said first plurality of thermocouple elements, a third plurality of thermocouple elements, means for maintaining said third plurality of thermocouple elements at a substantially constant temperature, a galvanometer having first and second deflection coils, first circuit means of predetermined resistance connecting said first plurality of thermocouple elements and an equal number of said second plurality of thermocouple elements in series to said first deflection coil for energizing the coil, and second circuit means of predetermined resistance connecting the remainder of said second plurality of thermocouple elements and said third plurality of thermocouple elements in series to said second deflection coil for energizing said second coil.

7. A thermometer for measuring the temperature of a rapidly flowing fluid medium, comprising, in combination, first temperature responsive means adapted to be disposed in a first position in said medium, first housing means for mounting said first temperature responsive means in said medium to subject said first temperature responsive means to a first degree of fluid compression, second temperature responsive means adapted to be disposed in a second position in said fluid medium, second housing means for mounting said second temperature responsive means in said medium to subject said second temperature responsive means to a second degree of fluid compression different from said first degree, third temperature responsive means responsive to a reference temperature, and indicating means operatively connected to said first, second, and third temperature responsive means and responsive to the temperature differential between said first and second temperature responsive means to indicate the true temperature of the fluid medium.

8. A thermometer for measuring the temperature of a rapidly flowing fluid medium, comprising a first plurality of thermocouple elements, first conical housing means mounting said first plurality of thermocouple elements in said fluid medium in a manner whereby said elements are maintained at a higher temperature $T_H$ than the true temperature $T_0$ of the fluid medium as a result of compression of the fluid on said mounting means and in an amount proportional to the speed of flow of the fluid and a factor $K_H$ predetermined by the characteristics of said first mounting means, a second plurality of thermocouple elements, second conical housing means disposed in a different direction from said first conical housing means for mounting said second plurality of thermocouple elements in said fluid medium in a manner whereby said second plurality of thermocouple elements are maintained by compression of the fluid on said second mounting means at a temperature $T_L$ above the true temperature $T_0$ but less than the temperature $T_H$ of said first plurality of thermocouple elements, said $T_L$ temperature being proportional to the speed of flow of the fluid medium and a factor $K_L$ predetermined by the characteristics of said second mounting means, a third plurality of thermocouple elements, means for maintaining said third plurality of thermocouple elements at a substantially constant reference temperature, an indicating galvanometer having first and second deflection coils, first circuit means of predetermined resistance connecting said first plurality of thermocouple elements and a preselected number of said second plurality of thermocouple elements in series to said first deflection coil for energizing the coil, and second circuit means of predetermined resistance connecting said third plurality of thermocouple elements and the remainder of said second plurality of thermocouple elements in series to said second deflection coil, said galvanometer, circuits, and elements having predetermined characteristics whereby the galvanometer deflection is proportional to the true temperature $T_0$ of the fluid medium as computed according to the formula $$T_0 = T_L - \frac{(K_L)}{K_H - K_L}(T_H - T_L)$$

9. In a thermometer for measuring the temperature of a rapidly flowing fluid medium, in combination, constant temperature means, first and second substantially flat heat conducting elements adapted to make contact with said fluid, each having a closure on one side thereof, disposed oppositely oriented in said fluid in a line substantially perpendicular to the path of flow, said first and second elements being subjected to different degrees of compression of said fluid, a first thermocouple having its hot junction means connected to said first element and having its cold junction means connected to said second element for generating a first thermocouple voltage; a second thermocouple having its cold junction means connected to said first element and having its hot junction means associated with said constant temperature means for generating a second thermocouple voltage, and differential indicating means responsive to said first and second thermocouple voltages, said differential indicating means comprising a galvanometer having first and second deflection coils separately energized from said first and second thermocouple voltages.

10. In a thermometer for measuring the temperature of a rapidly flowing fluid medium, in combination, constant temperature means, first and second shield members adapted to be substantially oppositely oriented in said fluid medium in a line substantially parallel to the path of flow, and subjected to two different degrees of compression of said fluid respectively, first thermocouple means having its hot and cold junction means mounted on said first and second shield members respectively for generating a first thermocouple voltage, said first and second shield members providing different degrees of shielding for the junction means mounted thereon respectively, second thermocouple means having junction means disposed similarly as the cold junction means of said first thermocouple means and having other junction means associated with said constant temperature means for generating a second thermocouple voltage, and differential indicating means responsive to said first and second thermocouple voltages, said differential indicating means comprising a galvanometer having first and second deflection coils separately energized from said first and second thermocouple voltages respectively.

11. In a thermometer for measuring the temperature of a rapidly flowing fluid medium, in combination, supporting means; constant temperature means carried by said supporting means; first and second plate members adapted to make contact with said fluid and having heat conducting inserts therethrough and each having a housing on one side thereof, mounted oppositely oriented on said supporting means, both said plate members being substantially perpendicular to the path of flow of the fluid medium, said first and second plate members being subjected to different degrees of compression of said fluid medium, a first thermocouple having its hot junction means connected to the inserts in said first plate member and having its cold junction means connected to the inserts in said second plate member for generating a first thermocouple voltage, a second thermocouple having its cold junction means connected to the inserts in said first plate member and having its hot junction means associated with said constant temperature means for generating a second thermocouple voltage; and differential indicating means responsive to said first and second thermocouple voltages, said differential indicating means comprising a galvanometer having first and second deflection coils separately energized from said first and second thermocouple voltages.

12. In a thermometer for measuring the temperature of a rapidly flowing fluid medium, in combination, a mounting plate; a pair of projecting struts mounted on the same side of said plate; first and second substantially conical housings, oppositely oriented, secured to the ends of said struts, the axes of said conical housings being substantially normal to the axes of the struts and parallel to the path of flow, and each of said housings having an inset base with a plurality of heat conducting rivets therethrough; constant temperature means mounted on the side of said plate opposite from the side on which said struts are mounted; a first plurality of series connected thermocouples having their hot junctions individually connected to the inner ends of a corresponding number of rivets in the base of said first housing and having their cold junctions individually connected to the inner ends of a corresponding number of rivets in the base of said second housing, the rivets in said first and second housings being maintained at different first and second temperatures respectively in accordance with the degree of compression of the fluid thereon, said first plurality of thermocouples generating a first thermocouple voltage; a second plurality of series connected thermocouples having their cold junctions individually connected to the inner ends of a corresponding number of remaining rivets in the base of said first housing, and having their hot junctions associated with said constant temperature means for generating a second thermocouple voltage; and a differential galvanometer responsive to said first and second thermocouple voltages.

13. In a thermometer for measuring the temperature of a rapidly flowing fluid medium, in combination, constant temperature means, first and second shield support members adapted to be substantially oppositely oriented in said fluid in a line substantially parallel to the path of flow and subjected to different degrees of compression of said fluid respectively, first thermocouple means mounted on said first support means whereby said first thermocouple means is maintained at a higher temperature $T_H$ than the true temperature $T_0$ of the fluid as a result of compression of the fluid and in an amount proportional to the speed of flow of the fluid, second thermocouple means mounted at said constant temperature means and maintained at a constant predetermined temperature thereby, third and fourth thermocouple means mounted on said second support member in a manner whereby said third and fourth thermocouple means are maintained by compression of the fluid at a higher temperature $T_L$ than said true temperature, said $T_L$ temperature being proportional to the speed of flow of the medium and less than the temperature $T_H$ of said first thermocouple means, a galvanometer having first and second deflection windings, first circuit means connecting said second and third thermocouple means in series to said first deflection winding whereby said deflection winding is energized by a current corresponding to $T_L$, and second circuit means connecting said first and fourth thermocouple means in series to said second deflection winding, said second circuit means containing predetermined constants whereby the second winding is energized by a current proportional to $$(T_H - T_L)\frac{K_L}{K_H - K_L}$$

where $K_H$ and $K_L$ are constants having values predetermined by the compression characteristics of said first and second mounting members and first, third, and fourth thermocouple means, said galvanometer being constructed and arranged to give an indication of $T_0$ as computed by the formula $$T_0 = T_L - \frac{K_L}{K_H - K_L}(T_H - T_L)$$

14. In a thermometer for measuring the temperature of a rapidly flowing fluid medium, first signal generating means adapted to be disposed at a first position in said medium for obtaining a first signal corresponding to the temperature of said first signal generating means, first mounting means for mounting said first signal generating means in said first position to subject said first signal generating means to a first degree of fluid compression, said temperature varying from the true temperature of the medium by an amount proportional to the speed of flow of the medium, the physical characteristics of said first signal generating means, and the fluid compression at the first signal generating means, second signal generating means adapted to be disposed at a second position in said medium for obtaining second and third signals each corresponding to the temperature of said second signal generating means, second mounting means for mounting said second signal generating means in said second position to subject said second signal generating means to a second degree of fluid compression different from said first degree, the temperature of the second signal generating means varying from the true temperature of the medium by an amount proportional to the speed of flow of the medium, the physical characteristics of said second signal generating means, and the fluid compression at said second signal generating means, the position of said second mounting means with respect to flow being different from the position of said first mounting means with respect to flow, means for obtaining a fourth signal corresponding to a fixed predetermined temperature, a galvanometer having an indicating member, a scale cooperating therewith, and first and second torque producing coils operatively connected to said indicating member and adapted when energized to move said member, first circuit means of predetermined characteristics having said first and second signals applied thereto and connected to one of said coils for energizing the same, and second circuit means of predetermined characteristics having said third and fourth signals applied thereto and connected to the other of said coils for energizing the same.

15. In a thermometer for measuring the temperature of a rapidly flowing fluid medium, first signal generating means disposed at a first position in said medium for obtaining a first signal corresponding to the temperature of said first signal generating means, first mounting means for mounting said first signal generating means in said first position to subject said first signal generating means to a first degree of fluid compression, said temperature varying from the true temperature of the medium by an amount proportional to the speed of the medium, the physical characteristics of said first means, and the fluid compression at the first signal generating means, second signal generating means disposed at a second position in said medium for obtaining second and third signals each corresponding to the temperature of said second signal generating means, second mounting means for mounting said second signal generating means in said second position to subject said second signal generating means to a second degree of fluid compression different from said first degree, the temperature of the second signal generating means varying from the true temperature of the medium by an amount proportional to the speed of flow of the medium, the physical characteristics of said second signal generating means, and the compression at said second signal generating means, the position of said second mounting means with respect to flow being different from the position of said first mounting means with respect to flow, means for obtaining a fourth signal corresponding to a fixed predetermined temperature, and indicating means having said first, second, third, and fourth signals applied thereto and constructed and arranged to compare the values of said signals and provide an indication of the true temperature of the fluid medium.

16. In a thermometer for measuring the temperature of a rapidly flowing fluid medium, first and second signal generating means adapted to be disposed in said medium and to generate first and second signals having values proportional at least in part to the degrees of compression of the fluid on the first and second means and to the true temperature of the medium, means for mounting said first and second means in said medium to have different degrees of fluid compression thereon, third signal generating means for generating a signal proportional to a predetermined temperature, and indicating means operatively connected to all said signal generating means and constructed and arranged to compare the values of the signals and indicate the true temperature of the medium.

THEODORE SHEDLOVSKY.

REFERENCES CITED

The following references are of record in the file of this patent:

UNITED STATES PATENTS

| Number | Name | Date |
|---|---|---|
| 1,166,331 | Davis | Dec. 28, 1915 |
| 1,206,304 | Chub | Nov. 8, 1916 |

OTHER REFERENCES

Popular Science, January 1940, page 101, article disclosing "Thermal Sniffer for Use of Glider Wing Tips."